VIDEO FROM SYNC AND SYNC FROM SYNC SEPARATOR

Filed Aug. 1, 1951

INVENTORS
Simeon I. Tourshou
& Gordon E. Skorup
BY
ATTORNEY

United States Patent Office 2,736,768
Patented Feb. 28, 1956

2,736,768

VIDEO FROM SYNC AND SYNC FROM SYNC SEPARATOR

Simeon I. Tourshou, Philadelphia, Pa., and Gordon E. Skorup, Westmont, N. J., assignors to Radio Corporation of America, a corporation of Delaware Application August 1, 1951, Serial No. 239,777

1 Claim. (Cl. 178—7.3)

This invention relates to television receiver circuits and more particularly it relates to synchronization separator circuit improvements, which provide for stable synchronization under weak signal conditions in the presence of high amplitude impulse noise.

Television scanning synchronization failure in the presence of the impulse noise occurs in fringe area reception or with weak signal conditions. Accordingly it is desirable to provide synchronization separator circuits and associated circuits which eliminate spurious response to the noise impulses encountered under weak signal conditions. Accordingly an object of the present invention is to provide improved separator operation in the presence of high noise weak signal conditions.

When the video signals are weak, the noise impulses superimposed thereupon are of a higher amplitude at the synchronization pulse separator stage than the video signal and unless complicated clipping circuits are provided the noise impulses may cause spurious responses in the operation of synchronization circuits. Therefore a simple, economical circuit is desirable, which would limit the noise superimposed upon synchronization signals to a substantially constant low amplitude level for weak signals as well as strong signals.

In synchronization separator circuits, noise impulses cause erratic operation in part due to the ineffective use of the entire synchronization pulse energy. For example, time constants are involved in the synchronization separator circuits, which cause an increase in the separator bias level to approximately the peak amplitude of the synchronization pulse upon conduction of the separator tube during the synchronization pulse period. Accordingly the separator circuit may respond more readily to noise impulses, which overcome the increased bias level than would be the case should the entire synchronization pulse energy be used in the separator circuit. Also on weak signals the energy content may be too small to afford normal functioning of the separator circuits. This undesirable effect, however, may be eliminated in accordance with the invention by the provision of circuits which improve the efficiency of using the waveform energy of the synchronization pulse so that the bias level of the separator tube does not appreciably change during the synchronization pulse interval.

When horizontal and vertical separator circuits are used having common bias circuits with different time constants, it is desirable to improve the separation response upon the reception of weak signals, having superimposed noise pulses, by providing more complete functional isolation of the horizontal and vertical separator circuits, so that the vertical separator tube does not appreciably interfere with the horizontal separator bias upon conduction. However, conversely, it is desirable to provide the vertical separator bias from the lower time constant horizontal bias circuit section so that the smaller time constant provided in the vertical biasing circuit thus provides a shortened recovery time for noise impulses, and therefore less tendency for erratic operation in the presence of high amplitude noise pulses.

Therefore in accordance with the invention there is provided a system having circuits improving the noise clipping operation in stages immediately preceding the synchronization separator circuit. Improved synchronization separator circuits are also used having provisions for eliminating picture jitter when noise pulses coincide with the vertical synchronization pulse. This is accomplished in part by providing vertical synchronization separation which provides vertical separator bias independent of the long vertical time constant, and further by providing a regenerative feedback circuit in the vertical separator so that the full energy content of the incoming synchronization pulse may be utilized.

It is therefore a general object of the invention to provide an improved television receiver system for providing synchronization separation which is not appreciably affected by noise impulses.

It is another object of the invention to provide noise limiting circuits which operate in accordance with signal strength to provide lower values of superimposed noise upon low strength video signals than otherwise possible.

It is another object of the invention to provide horizontal and vertical synchronization separator circuits with common biasing circuits yet providing bias for the horizontal separator circuit substantially independent from any conduction current of the vertical separator circuit.

It is a further object of the invention to improve the efficiency of the synchronization separator circuit by utilizing substantially the entire amount of the input energy in operation of the circuit.

For a clear understanding of the operation of the invention, together with further objects and advantages of the invention, the following description should be read in connection with the accompanying drawings in which.

Figure 1:
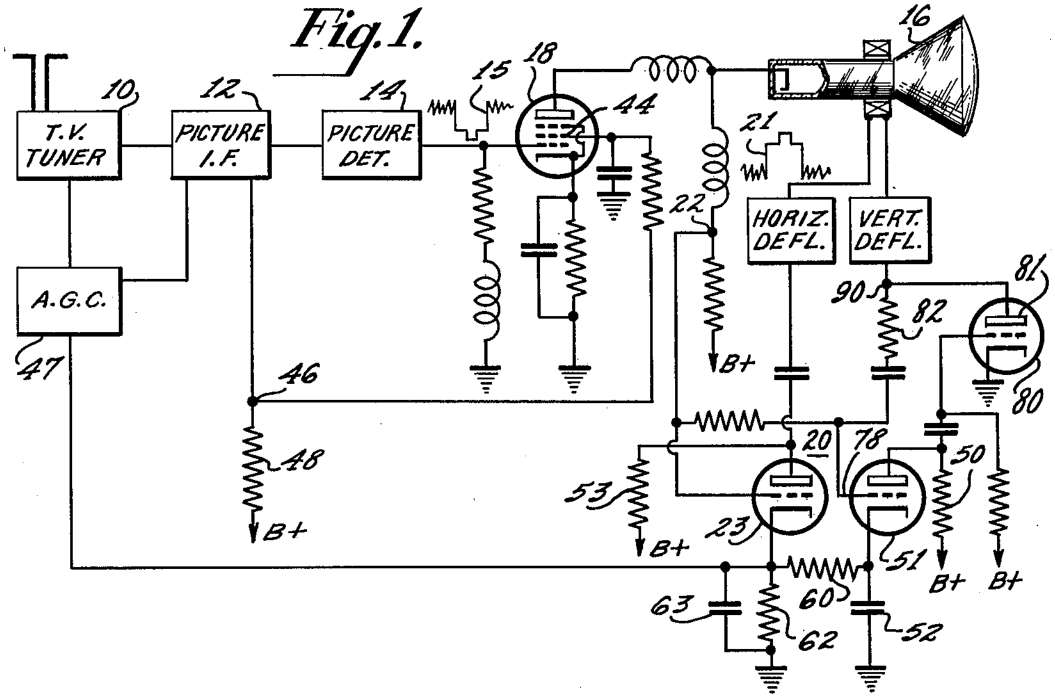
Figure 1 is a schematic circuit diagram illustrating the organization and operation of the invention.

Referring now to the drawing, and in particular to Figure 1, there is shown a television receiver circuit with a tuner 10 providing a signal for the succeeding cascade coupled picture intermediate frequency amplifier circuit 12, video detector 14, video amplifier tube 18 and an image reproducer 16. The circuits to which the present invention is directed include the video amplifier stage comprising the electronic tube 18 together with the synchronization separator circuit 20 comprising the two triode tubes 23 and 51. The portions of the receiver circuit shown in block diagram are well known to those skilled in the art and need not be described in detail for a clear understanding of the present invention.

The synchronization separator tube 23 operates in accordance with a waveform 21 derived from the anode circuit of the video amplifier tube 18 at the terminal 22. Therefore, to improve the operation of the synchronization separator circuit 20, the video amplifier 18 is operated as a noise limiter by utilizing the cutoff characteristic of the tube to clip the noise impulses superimposed on the incoming signal 15, which has negative polarity synchronizing pulses. This operation, however, does not give adequate noise clipping in the presence of weak signals unless the acceptance of the tube is varied in accordance with the signal strength as provided by the invention. The noise is clipped at a level closer to the synchronization pulse peaks for weak signals in accordance with the invention by providing a video amplifier screen potential variable with signal strength.

Figure 2:
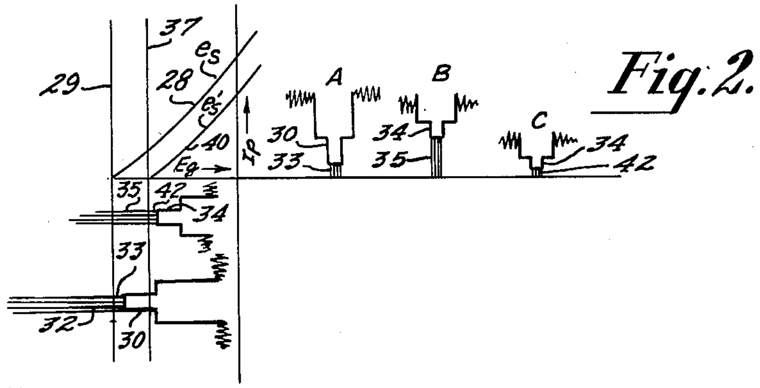
Figure 2 is a graph illustrating the operation of the noise clipping portion of the invention.

In order to understand the nature of the noise limiting circuit, the graph of Figure 2 may be referred to along with the circuit of Figure 1. For normal video amplifier screen potential $e_s$, the grid voltage versus plate current curve 28 is typical. It is noted therefore that in the presence of a strong signal the synchronization pulse 30 may have noise pulses 32 extending beyond cutoff 29, but only a small portion 33 of these noise impulses are superimposed upon the amplified pulse in the output circuit of the video amplifier. The remaining noise pulse amplitude is effectively limited, as shown in the output voltage waveform A, because the acceptance characteristics of the video amplifier tube. The output voltage waveforms A, B and C are reduced in size for purpose of simplicity. For a weaker signal, the synchronization pulse 34 is amplified by the normal video amplifier stage to provide a much larger amplitude of noise impulse distortion 35 superimposed upon the synchronization pulse as indicated in the output voltage waveform B. This noise energy is in part responsive for erratic operation of synchronization separator circuits under weak signal conditions.

In accordance with the improved video amplifier circuit of the present invention an output current response curve 40 is provided with reduced screen potential $e_s'$ such that the cutoff potential is changed to position 37. Therefore only the small amplitude 42 of noise is superimposed upon the smaller amplitude synchronization pulse 34 when amplified, as indicated by waveform C. To make the acceptance curve of the amplifier dependent upon signal strength, in the preferred embodiment of the invention, the screen grid electrode 44 is operated at a potential variable in accordance with the signal strength. This variation of screen potential, as will be recognized by those skilled in the art, changes the video amplifier tube operating conditions in the manner shown by Figure 2.

An economical and highly satisfactory manner of obtaining such screen potential variation is to derive the screen potential from a terminal point 46 which is connected to the anode circuit of an intermediate frequency amplifier stage, incorporated in the picture intermediate frequency amplifier strip 12. Accordingly in the presence of a strong signal, the screen potential of the amplifier tube 18 as seen at terminal 46 will rise to the screen potential value for normal video amplifier operation. With a weaker video signal, however, the potential drop across the picture intermediate frequency amplifier series plate resistor 48 will increase, thus reducing the screen grid potential on the video amplifier tube 18 and providing for a new video amplifier clipping level, thereby effectively providing the noise clipping operation illustrated by the graph of Figure 2. Automatic gain control potential from circuit 47 will cause the plate current of the intermediate frequency amplifier tube to increase in the presence of a weaker signal and conversely to decrease with a stronger signal, as is well known in the art.

Accordingly the synchronization signal inserted at the synchronization separator tube 23 has essentially the same small amplitude of superimposed noise distortion for signals of strengths within a large range causing improved operation of the synchronizing circuits, as will be hereinafter explained more completely. With such a signal more effective synchronization separation may be effected with normal separator circuits. However, to even further improve the synchronization separation at low signal levels, or in fringe area operation, the synchronization separator circuit is modified in further accordance with the invention for improved operation. Normal operation of the cathode coupled duo-triode synchronization separator circuit is described in the copending United States patent to S. I. Tourshou, Pat. No. 2,650,450, issued September 15, 1953, entitled "Sync Separation and Automatic Gain Control," and therefore need not now be explained except for the novel features of the present invention.

Operation of the basic circuit is improved in accordance with the present invention by providing a very high impedance anode resistor 50 for the vertical section 51 of the synchronization separator circuit 20. This anode resistor 50 in combination with the horizontal separator bias resistor 62 provides such a large resistance ratio that there is effectively no change of charge on the capacitor 63 by vertical separator tube conduction during the vertical synchronization pulse intervals. Since the horizontal separator tube 23 has a low resistance anode resistor 53, the horizontal tube current is large enough to maintain bias at the cathode circuit 62, 63 effectively dependent upon the horizontal tube alone. The horizontal and vertical channels are therefore effectively divorced in operation, with the exception that the vertical separator section has a portion of its cathode bias derived from the horizontal separator section, which is desirable for permitting improved recovery of the vertical section to noise impulses, as indicated in the above described copending application.

Figure 3:
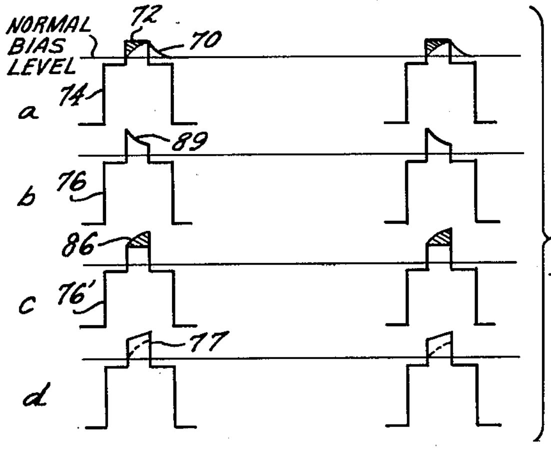
Figure 3 is a chart showing waveforms which illustrate the utilization of the entire incoming energy content of the synchronization pulse in accordance with the invention.

Referring now to Figures 1 and 3 the operation of further portions of the invention may be more readily seen. For example, consider the right hand section 51 of the separator circuit 20, which is the vertical separator section. Therein the vertical synchronization pulse bypass capacitor 52 is connected in circuit with the cathode resistor 60 to provide, in effect, a portion of the grid to cathode circuit for the vertical separator section. The voltage in this circuit is dependent to some degree upon vertical separator tube conduction. Accordingly the bias level will change with tube anode current upon presence of an incoming synchronization signal as indicated in the curve 70 of Figure 3*a*. This will cause the tube output energy to correspond only to the energy contained in the shaded portion 72 of the synchronization pulse. As before indicated, this effect causes a greater response of the circuit to noise amplitude pulses than would result should the entire energy of the synchronization pulse be utilized.

At the anode 81 of the succeeding vertical synchronization amplifier tube 80, the amplified portion 89 of synchronization pulse 76 (Figure 3*b*) is provided of such a phase that regenerative feedback may be accomplished at the grid 78 of the vertical synchronization tube section 51. The waveform will have the general shape 89 (shown in Figure 3*b*) as seen at the anode 81, in the absence of compensation or feedback.

By using a wave-forming network such as the high value of resistance 82 in a feedback circuit connecting the grid 78 to the anode 81, the feedback voltage may be integrated (with the grid-to-ground tube capacity component) to correspond to the shaded section 86 of the synchronization pulse 76' of Figure 3*c*. This voltage on the grid of the vertical separation tube section will compensate for the voltage variation in the cathode resistor in a substantially equal and opposite manner, so that there results a full utilization of the energy of the incoming synchronization pulse, which results in the fully amplified synchronization pulse 77 of Figure 3*d*. The full energy of the synchronizing pulse is effectively amplified and therefore becomes available for operation of the vertical oscillator circuit at the terminal 90, and provides better operation in the presence of noise or weak signal conditions as hereinbefore described.

It is to be recognized that the waveforms of Figure 3 are approximate and are only illustrative of the tube operation since the waveform 89 is modified in form when the regenerative feedback compensation circuit 82 is connected. It is evident however that by using a regenerative feedback circuit of the type disclosed, the synchronization separator linearity is improved as well as the efficiency of using the synchronization pulse. Accordingly better overall operation results with this phase of the invention during weak signal, high noise operating conditions, because the cathode and grid of the vertical separator tube 51 are both kept at the same relative voltage difference upon conduction of the tube.

There has therefore been provided in accordance with the invention a combination of circuit features which cooperate to afford greatly improved television reception in fringe areas or under other weak signal conditions in the presence of impulse noise by affording stabilized and improved synchronization circuit operation.

What is claimed is:

In a television receiver, a synchronizing signal separator circuit apparatus comprising in combination: a reference potential means forming an electrical reference for the circuit as hereinafter defined; variable gain means for receiving and demodulating television signals having a synchronizing component, said means being controllable by an automatic gain control signal; automatic gain control means connected with said receiving means applying an automatic gain control signal to said receiving means such to stabilize the amplitude of demodulated signals delivered by said receiving means; a noise clipping video signal amplifier stage coupled with said receiving means, said video amplifier including controllable bias means operatively coupled with said automatic gain control means for maintaining noise clipping of said video signals at a substantially constant level over a wide range of signal levels received by said receiving means; a vertical and a horizontal synchronizing separator circuit means each including a respective discharge tube, each tube having at least an anode, cathode and control electrode circuits so related that the separating level of each separator circuit is dependent upon the cathode bias potential caused to appear in the cathode circuit of each respective tube; means operatively coupling noise clipped signal from said video signal amplifier stage in operative relation to the control electrode circuits of said discharge tubes with such polarity as to increase current in said discharge tubes in response to synchronizing signals; the cathode circuit of the horizontal synchronizing separator tube comprising a relatively short time constant bias defining means connected between the cathode of said horizontal separator circuit discharge tube and said reference potential means, said time constant bias defining means comprising the parallel combination of a capacitor and a relatively low value of resistor to form a time constant which is short compared to the recurrence rate of vertical synchronizing signals; the cathode circuit of the vertical synchronizing separator tube comprising a resistor of relatively high value compared to said low value resistor operatively connected from the cathode of said horizontal separator tube to the cathode of said vertical separator tube to form a galvanically conductive path between the cathodes of said horizontal separator tube and vertical separator tube, the value of said high value resistor being sufficient to substantially divorce horizontal separator action from influence by vertical separator action; a capacitor connected in the cathode circuit of said vertical separator tube of a value greater than the value of capacitor connected in the cathode circuit of said horizontal separator tube and connected in shunt with at least said high value resistor to form a bias defining time constant circuit for said vertical separator tube cathode circuit of time constant value sufficiently longer than said short time constant bias defining means that the cathode bias potential of said vertical separator tube is a function of the amplitude of vertical synchronizing signals; a first output resistor connected in series with said horizontal separator tube anode and a source of anode polarizing potentials that is positive with respect to said reference potential means; a second output resistor connected in series with the vertical separator tube anode and a source of anode polarizing potential that is positive with respect to said reference potential means, the values of said first and second resistor being so related to the gain of said discharge tubes that the bias in said horizontal separator tube cathode circuit is substantially independent of the bias developed in said vertical separator discharge tube cathode circuit while the bias developed in the cathode circuit of said vertical separator tube is a significant function of the bias developed in said horizontal separator discharge tube cathode circuit; horizontal and vertical television deflection circuits; means coupling said deflection circuits respectively to said first and second output resistors for response to separated synchronizing signals appearing thereacross; and regenerative feedback means operatively coupled from the anode circuit of the vertical separator tube to the input circuit of said vertical separator tube to regeneratively improve the waveform of the clipped synchronizing signals delivered by said vertical separation circuit.

References Cited in the file of this patent

UNITED STATES PATENTS

| | | |
|---|---|---|
| 2,245,409 | Miller | June 10, 1941 |
| 2,293,528 | Barco et al. | Aug. 18, 1942 |
| 2,354,032 | Lyman | July 18, 1944 |
| 2,356,141 | Applegarth | Aug. 22, 1944 |
| 2,453,081 | Sziklai | Nov. 2, 1948 |
| 2,500,839 | Lord | Mar. 14, 1950 |
| 2,573,248 | Cotsworth | Oct. 30, 1951 |
| 2,631,230 | Marsh | Mar. 10, 1953 |